United States Patent [19]

Nakayama et al.

[11] Patent Number: 4,585,055
[45] Date of Patent: Apr. 29, 1986

[54] LIQUID FILM EVAPORATION TYPE HEAT EXCHANGER

[75] Inventors: Wataru Nakayama, Kashiwa; Takahiro Daikoku, Ibaraki; Tadakatsu Nakajima, Ibaraki; Heikichi Kuwahara, Ibaraki; Akira Yasukawa, Ibaraki, all of Japan

[73] Assignee: Hitachi, Ltd., Tokyo, Japan

[21] Appl. No.: 552,417

[22] Filed: Nov. 16, 1983

[30] Foreign Application Priority Data

Nov. 19, 1982 [JP] Japan .................. 57-201940

[51] Int. Cl.[4] ..................... F28D 5/02; F28F 25/00
[52] U.S. Cl. ..................... 165/115; 165/113; 165/907; 417/208
[58] Field of Search ............ 165/115, 116, DIG. 10, 165/118, 113; 417/208

[56] References Cited

U.S. PATENT DOCUMENTS

| | | | |
|---|---|---|---|
| 970,807 | 9/1910 | Faget | 165/116 X |
| 1,694,370 | 12/1928 | Burdick | 165/118 X |
| 2,038,002 | 4/1936 | Ris | 165/116 |
| 2,944,966 | 7/1960 | Eickmeyer | 165/116 X |
| 3,332,469 | 7/1967 | Rosenblad | 165/115 X |
| 4,119,140 | 10/1978 | Cates | 165/115 X |
| 4,371,034 | 2/1983 | Yamada et al. | 165/113 X |

FOREIGN PATENT DOCUMENTS

| | | | |
|---|---|---|---|
| 221553 | 6/1962 | Austria | 165/115 |
| 1027821 | 5/1953 | France | 165/115 |

Primary Examiner—Sheldon J. Richter
Attorney, Agent, or Firm—Antonelli, Terry & Wands

[57] ABSTRACT

A liquid film evaporation type heat exchanger including a plurality of heat transfer units, with each unit including a plurality of flat heat transfer ducts of square cross section formed with a plurality of warm water passageways extending perpendicular to the direction of flow of a liquid medium, and a plurality of liquid distributing beams formed with a pluraity of cutouts. The heat transfer ducts and the liquid distributing beams being alternately arranged in the respective units, with the heat transfer units being arranged at locations spaced apart from each other in the direction of flow of the liquid medium. Vapor releasing ports are formed in positions between the adjacent heat transfer units. Each heat transfer duct has on either side surface thereof a porous material layer providing a heat exchange surface on which a film of the liquid medium is formed for evaporation.

3 Claims, 8 Drawing Figures

FLOW RATE OF LIQUID REFRIGERANT
Γo (Kg/m·s)

LIQUID FILM EVAPORATION TYPE HEAT EXCHANGER

BACKGROUND OF THE INVENTION

This invention relates to a Rankine cycle heat exchanger (evaporator) using a low boiling point medium as a working fluid, in, for example a refrigerating apparatus and a nuclear power generating plant.

Typical prior art shell-tube type heat exchangers include a plurality of heat transfer tubes located in a cylindrical shell, with a medium, in a liquid state, being filled in the shell and with warm water being passed through the heat transfer tubes to allow a nucleate boiling heat transfer to take place on outer wall surfaces of the heat transfer tubes. In recent years, attention has been attracted to Rankine cycle generating plants which use a low boiling point medium as a working fluid so as to enable an effective use of low temperature energy, such as waste heat, geothermal heat, marine temperature differences, etc. To this end, it is desired that a heat exchanger of smaller size and higher performance than the shell-tube type heat exchanger be developed. Various types of heat exchanger have been proposed which might meet the needs.

To meet the above described needs in, for example, British Patent Specification 261,731 a heat exchanger is proposed which includes a plurality of vertically arranged heat transfer tubes, with a medium, in a liquid state, flowing downwardly in the form of a liquid film along an outer wall surface of each of the tubes to accelerate vaporization of the liquid. In this type of heat exchanger, it is necessary to supply a sufficiently large quantity of liquid from above to prevent the wall surfaces of lower portions of the heat transfer tubes from becoming dry. As a result, a mean thickness of the liquid film on each heat transfer tube of a great length can not be reduced to a satisfactorily low level. Also, at working points other than those of design load, a liquid flowing downwardly through a supply port located at a higher elevation might reach a supply port located at a lower elevation before vaporization of all the liquid takes place and the liquid flowing downwardly and the newly supplied liquid through the supply port would flow in a two-phase stream flow, thereby greatly reducing the performance of the evaporator. The liquid flowing downwardly from the supply port located at the higher elevation might be completely evaporated before reaching the supply port at the lower elevation, thereby also reducing the performance of the evaporator due to the presence of a dry heat transfer surface. Thus, it would be impossible for this type of heat exchanger to achieve a marked improvement in the performance of the evaporator. Even if high performance could be obtained with respect to a design load, it would be impossible to maintain the performance of the evaporator at the planned level by suitably coping with changes that the load applied to the evaporator might undergo.

This invention has as its object the provision of a heat exchanger compact in size, low in resistance offered to the flow of a two-phase mixture of liquid and gas of a medium that vaporizes and high in heat exchanging performance, and which is capable of maintaining its heat exchanging performance at a high level even if the capacity of a heat source undergoes a change and a load other than a design load is applied to the heat exchanger.

In accordance with the present invention, a liquid film evaporation type heat exchanger is provided wherein a medium, in a liquid state, flows downwardly in the form of a film along heat transfer surfaces, with the heat exchanger comprising at least two heat transfer units arranged at locations spaced apart from each other in a direction in which the medium in the liquid state flows. Each of the heat transfer units includes a plurality of planar heat transfer ducts each formed with a plurality of warm water passageways extending perpendicular to the direction of flow of the medium in the liquid state, and a plurality of liquid distributing beams each formed with a plurality of cutouts. The planar heat trasfer ducts and the liquid distributing beams are alternately arranged in the respective units, and a port, for releasing the medium in a gaseous state, is positioned between the adjacent heat transfer units.

DETAILED DESCRIPTION

A preferred embodiment of the invention will now be described by referring to the accompanying drawings.

Figure 1:
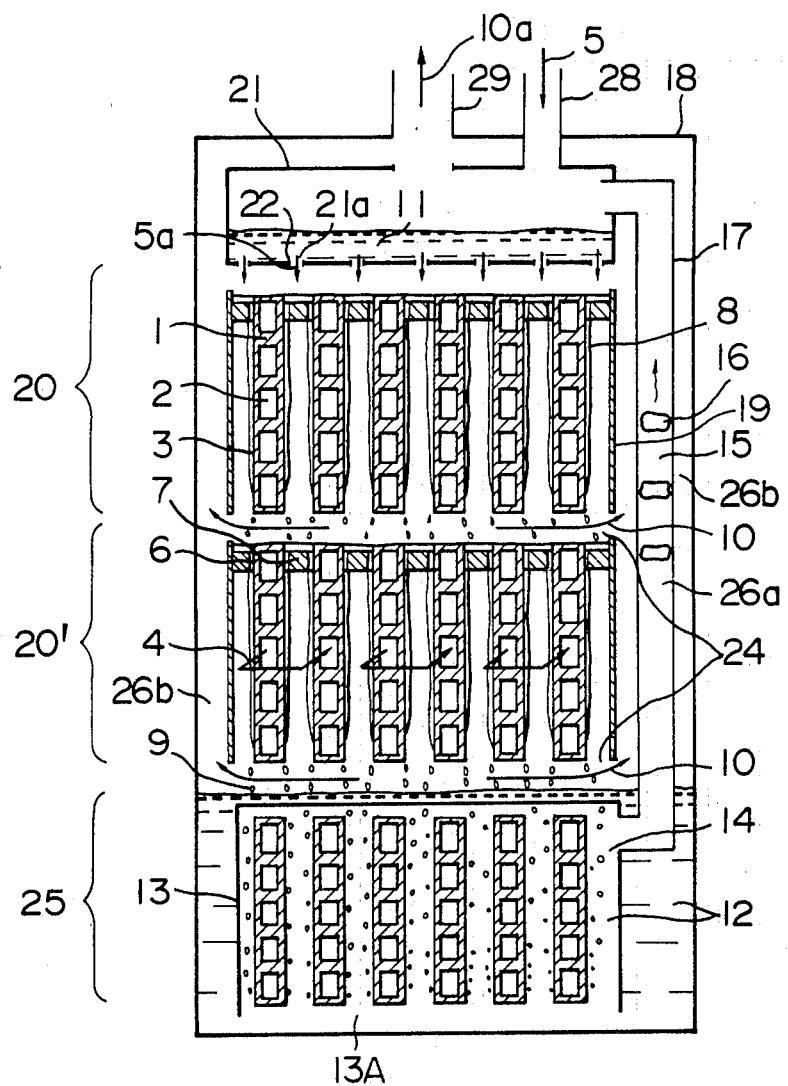
FIG. 1 is a vertical sectional view of one embodiment of the liquid film evaporation type heat exchanger in accordance with the present invention.

Referring now to the drawings wherein like reference numerals are used throughout the various views to designate like parts and, more particularly, to FIG. 1, according to this figure, the heat exchanger comprises two heat transfer duct groups or heat transfer units 20 and 20', one heat transfer duct group or heat transfer unit 25 contained in a partitioned chamber 13 filled with a liquid medium 12, a liquid medium sump 21 located above the heat transfer duct group 20 and maintained in communication with the partitioned chamber 13 via pipes 17 and a housing 18 housing therein the heat transfer duct groups or units 20, 20' and 25 and liquid medium sump 21. Guide plates 19 are located on opposite sides of the heat transfer duct groups 20 and, 20' for protecting a liquid film 8 from a gaseous medium 10 flowing in an upwardly oriented flow and separating a liquid passageway 26a from a vapor passageway 26b. Vapor discharge ports 24 are formed between the guide plates 19 and the heat transfer duct groups located at a lower level than the guide plates 19. The liquid medium sump 21 is formed at a top wall with an inlet port 28 and outlet ports 29 and at a bottom wall with a plurality of openings 21a each equipped with a weir 22. Both end portions of each heat transfer duct 1 are connected by welding, brazing, pressure welding or the like to end plates (not shown) which constitute a part of the housing 18. At the outside of the end plates is arranged a water chamber case (not shown) for the warm water flowing through each heat transfer duct.

The partitioned chamber 13 is defined by a metal plate or the like surrounding the heat transfer duct group 25 not provided with the liquid distributing beams 7 and is able to collect vapor bubbles produced by pool boiling. The lateral end portions of the metal plate are connected to the inside of the end plates constituting a part of the housing 18 by welding, brazing, pressure welding or the like. The lower end portion of the partitioned chamber 13 constitutes a communication passage 13A.

Figure 2:
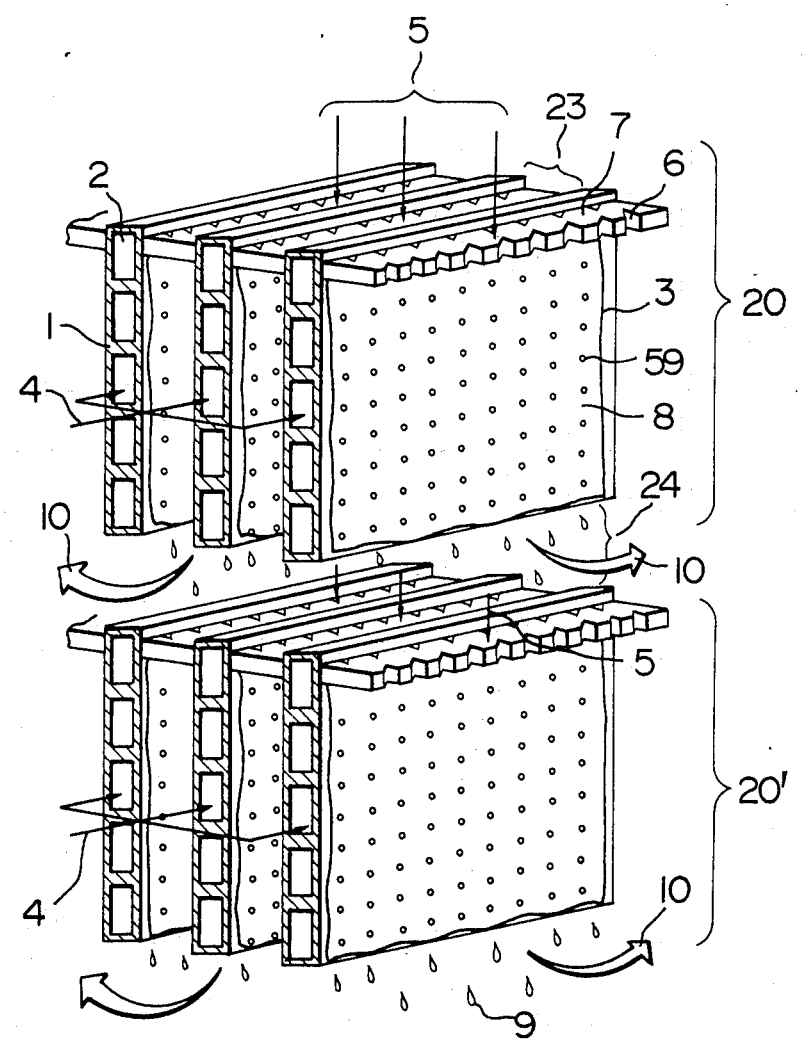
FIG. 2 is a perspective view of portions of the heat exchanger shown in FIG. 1 comprising a plurality of heat transfer duct groups.
Figure 3:
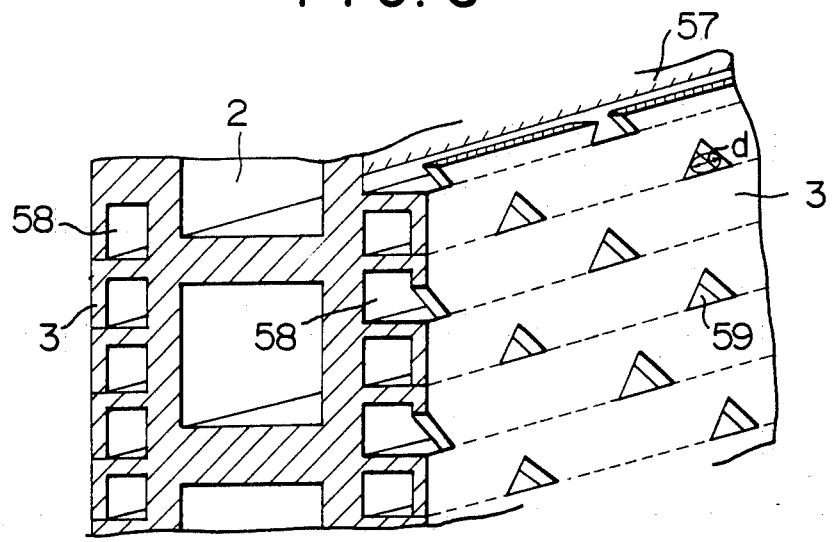
FIG. 3 is a perspective view of the porous material layer forming heat transfer surfaces.

The heat transfer duct groups or units 20 and 20' are shown in detail in FIG. 2 in which the planar or flat heat transfer ducts 1, of square cross section, are each formed with a plurality of passageways 2 extending in a direction perpendicular to the direction of a liquid medium 5 for warm water 4 to flow therethrough. Each heat transfer duct 1, as shown most clearly in FIG. 3, is provided on each of the opposite side surfaces thereof with a porous material layer 3 having a plurality of minuscule cavities under a surface portion which is formed with a plurality of minuscule apertures 59 communicating with the cavities. More specifically, each of the porous material layers 3 is formed with a plurality of tunnels 58 connecting the cavities together, and the minuscule apertures 59 are communicated with the tunnels 58. The porous material layers 3 may be formed on opposite side surfaces of each heat transfer duct 1 by a method described in, for example, U.S. Pat. No. 4,060,125. The heat transfer tube 1 may be formed beforehand with the passageways 2 by subjecting copper material to extrusion forming.

The heat transfer duct group 20 may be formed by arranging a plurality of liquid distributing beams 7 formed with a plurality of cutouts 6 and the heat transfer ducts 1 alternately in parallel with each other. In the invention, at least two heat transfer duct groups 20 are arranged in a superposed relation in the direction of flow of the liquid medium 5 in accordance with the amount of heat exchange desired to be effected, to constitute heat transfer surfaces of the heat exchanger.

The liquid medium 5 flowing onto the liquid distributing beams 7 is collected in troughs 23 formed by the heat transfer ducts 1 and liquid distributing beams 7, and flows therefrom downwardly through the cutouts 6 of the liquid distributing beams 7 to form the liquid films 8 on the surfaces of the porous material layers 3 on opposite side surfaces of the heat transfer ducts 1. The liquid films 8 flow downwardly while being subjected to vaporization by heat transferred from the warm water 4 flowing through the passageways 2 defined in the heat transfer ducts 1. The liquid medium 5 that has not been vaporized on the porous material layers 3 flows downwardly into the heat transfer duct group 20' located beneath the heat transfer duct group 20.

The minuscule apertures 59 formed at the surface portion of each of the porous material layers 3 are less than 1 mm in diameter d (see FIG. 3) and have irregular shapes. When an imaginary circle contacting an inner edge of each minuscule aperture 59 has a diameter d in the range between 0.05 and 0.5 mm, heat transfer by vaporization is accelerated. More specifically, vapor is ejected from the cavities in the porous material layers 3 through some apertures 59 and liquid enters through other apertures 59 into the cavities to compensate them for a loss of vapor mass. When wall surfaces of the cavities are heated by a slight difference in temperature, the liquid entering into the cavities vaporizes in a short period of time and is ejected again in the form of vapor. When the liquid film 8 has a large thickness, the ejected vapor crosses the liquid film 8 in the form of vapor bubbles and reaches its surface. However, when the liquid film 8 has small thickness, the ejected vapor fails to turn into bubbles and is directly released from the surface of the porous material layer 3 without having anything to do with the liquid film 8. By virtue of this mechanism, the liquid is readily vaporized and the vapor bubbles are vigorously produced even if the temperature difference between the heat transfer walls and the liquid medium is below 1° C., so that the porous material layers 3 have a heat transfer rate which is ten times as high as that obtained with ordinary planar wall surfaces. The porous material layers 3 of the aforesaid surface construction can be produced by machining or adhering metal particles to the surfaces of the heat transfer ducts 1 by, for example, sintering.

Referring to FIG. 1 again, the liquid medium 5 introduced into the housing 18 through the inlet port 28 is first collected in the liquid medium sump 21 and then successively flows into the heat transfer duct groups 20 and 20' through the openings 21a after overflowing the respective weirs 22. The liquid medium 5 vaporized by heat exchange on the porous material layers 3 of each heat transfer duct 1 of each heat transfer duct group, as the gaseous medium 10, through the vapor discharge ports 24 formed between the adjacent heat transfer duct groups 20, 20' and 25 and the vapor passageway 26b defined between the guide plates 19 and the housing 18, to be released to outside as a vapor stream 10a through the outlet port 29. Meanwhile the warm water 4 flows through the warm water passageways 2 in the heat transfer duct 1 in a number of passes which are commensurate with the amount of heat to be exchanged in a selected combination of the number of heat transfer ducts 1 with a header, not shown.

In the heat transfer duct group 25 contained in the partitioned chamber 13, heat transfer takes place by nucleate boiling to produce vapor bubbles 14 which coalesce into larger bubbles 16. The bubbles 16 cooperate with liquid medium passes 15 to form a two-phase mixture flowing through the pipe 17 to act as a bubble pump. Thus, a liquid medium 12 in a lower portion of the housing 18 flows in circulation to the liquid medium sump 21 in an upper portion of the housing 18.

The gaseous medium 10 produced by heat exchange on surfaces of the porous material layers 3 of the heat transfer ducts 1 flows parallel to the stream of the liquid film 8 in the same direction as the liquid medium 5, and when it reaches the lower end of the heat transfer duct group 20, the gaseous medium 10 flows transversely through the vapor discharge ports 24 between the heat transfer duct groups into the vapor passageway 26b.

In the embodiment described hereinabove, the flow direction of the refrigerant vapor 10 produced on the porous material layers 3 on the outer surfaces of the heat transfer ducts 1 may be made identical with the direction in which the regrigerant liquid film 8 flows or drops between the heat transfer ducts 1, so that the relative velocity between the liquid film flow and the vapor flow may be reduced. Consequently, it is possible to supress such function that the vapor flow 10 disturbs the liquid film 8 flowing downwardly on the porous material layers 3 on the outer surfaces of the heat transfer ducts 1, which contributes to the formation of the stable liquid film flow 8 on the porous material layers 3 and hence to maintaining higher evaporation heat transfer rate of the downwardly flowing liquid film. Further, in the illustrated embodiment, the heat transfer ducts 1 are divided into the heat transfer duct groups 20, 20' and 25 arranged at locations spaced apart from each other in a direction in which the refrigerant liquid flows, and the vapor produced is discharged from each of the heat transfer duct groups or units. This structure enables a reduction of the velocity of the vapor flowing between the heat transfer ducts 1 as compared with the case where the heat transfer ducts 1 are not divided into the groups, and hence a reduction of the flow resistance of the vapor flowing between the heat transfer ducts 1. As will be understood, an amount of the vapor produced increases toward the downstream or lower end of the heat transfer ducts 1 and hence the flow velocity of the vapor correspondingly increases toward the downstream end thereof. Thus, if the vapor is not discharged through the vapor discharge port 24 defined between the heat transfer duct groups 20 and 20', a large amount of vapor at the lower end of the heat transfer duct group 20 is led into the lower heat transfer duct group 20'. In the duct group 20', an amount of the vapor increases toward the lower end of the duct group 20' so that the flow velocity of the vapor correspondingly increases toward the lower end thereof. Such increase in the vapor flow velocity disadvantageously causes the increase in vapor flow resistance. In accordance with the invention, however, the heat transfer ducts are divided into a plurality of heat transfer duct groups 20, 20' and 25 and the vapor discharge ports 24 are provided between the adjacent heat transfer groups. Thus, a large quantity of vapor is not led from the heat transfer duct group 20 to the heat transfer duct group 20', and from the group 20' to the group 25. This contributes to reducing vapor flow resistance in the duct group or groups located at a lower level than the group 20, as will be understood from the foregoing description.

Furthermore, with the structure of the illustrated embodiment in which the vapor discharge ports 24 which are constituted by the spaces defined between the heat transfer duct groups 20, 20' and 25 are adapted to discharge therethrough the vapor produced in the respective heat transfer duct groups, the vapor flow resistance in the vapor passageway 26b may be reduced as compared with the case where the heat transfer ducts 1 are not divided into heat transfer duct groups. Further, in the illustrated embodiment, the liquid distributing beams 7 are arranged at an upper portion of each of the heat transfer duct groups 20 and 20' in such a manner that the liquid distributing beams 7 and the heat transfer ducts 1 are stacked alternately with each other. Since the liquid distributing beams 7 are arranged at the upper part of the lower group 20', the refrigerant liquid 9 which has not been vaporized in the upper group 20 and drops therefrom may be preferably distributed again at the upper part of the lower group 20' and hence it is possible to form a uniform liquid film flow in the lower heat transfer duct group 20°.

In the case where the heat transfer ducts 1 are not divided into the heat transfer duct groups and hence the liquid film 8 has to flow downwardly for a longer distance, the more the liquid film flows downwardly toward the downstream, the more the thickness of the liquid film becomes non-uniform and dried surface appears on the heat transfer ducts. When the dried heat transfer surface occurs, the heat transfer performance is suddenly lowered since heat transfer through liquid film evaporation is not effected on the dried surface. In contrast, in the case where the heat transfer ducts are divided into heat transfer duct groups as in the illustrated embodiment, it is possible to produce a uniform liquid film in each of the heat transfer groups and hence to prevent a lowering of the heat transfer performance.

As will be understood from the foregoing description, the structure in which the heat transfer ducts 1 are divided into a plurality of heat transfer duct groups which are at least two in number and arranged in superposed relation in the refrigerant liquid flowing direction (i.e., arranged at locations spaced apart from each other in a direction in which the liquid flows,) contributes to reducing flow resistance of the vapor flow as well as to producing uniform liquid film flow with the resultant high heat transfer performance of the heat exchanger. Also, it will be understood that the heat transfer ducts may be divided into an appropriate number of the heat transfer duct groups, and the number of the groups is determined according to the heat load of the evaporator and the amount of refrigerant liquid to be circulated.

The provision of the plurality of warm water passageways 2 to each heat transfer duct 1 increases the heat transfer area for the warm water 4 and hence improves the overall heat transfer coefficient. The number of water passageways per unit width of the heat transfer duct 1 is determined to meet the requirement that the product of the heat transfer coefficient on the water passageway and the heat transfer area of the water passageway per unit width of the heat transfer duct roughly matches the product of the heat transfer coefficient on the porous surface, which is necessarily high due to the effect of the porous structure, and the projected area of the porous surface (that is, the area not including the real area increase brought by the tunnel walls, provided that the heat transfer coefficient on the porous surface is defined on the basis of the projected area). The use of the flat heat transfer ducts 1 increases the effectiveness of thin film evaporation on the porous material layers 3 through realizing uniformity of the liquid film over the surface in contrast to the liquid film flow around circular tubes, and, moreover, contributes greatly to the increase in heat transfer area per unit volume of the evaporator, thereby realizing unprecedentedly compact evaporators.

When water is used as the liquid medium 5 and its thin film is formed on each heat transfer surface formed on each porous material layer 3 of each heat transfer duct 1 to be vaporized by heat exchange to enhance heat transfer, heat transfer performance is greatly improved as compared with the case of pool boiling heat transfer.

Figure 4:
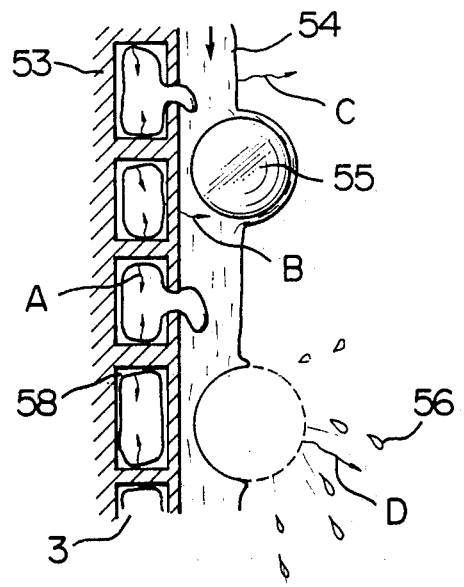
FIG. 4 is a view in explanation of operation of the heat exchanger according to the invention.

FIG. 4 shows the manner in which heat transfer is enhanced by vaporization of a liquid film. The heat transfer mechanism for transmitting heat from a heat transfer surface 53 to a downwardly flowing liquid film 54 would occur in the following four forms. In its first form, a heat transmission (A $(=Q_{NB})$ would take place as a heat transfer occurs due to the vaporization of liquid inside the tunnel walls, the supply of such liquid being made by the pumping action of growing then leaving vapor bubbles on the heat transfer surface 53. In a second form, a heat tranmission B $(=Q_{CW})$ would take place as a forced convection heat transfer occurs from the heat transfer surface 53 to the liquid film flow 54. In a third form, a latent heat transmission C ($=Q_{FV}$) would take place as a result of vaporization occurring on the surface of the liquid film 54. In a fourth form, a sensible heat transfer D ($=Q_{LD}$) would take place when liquid drops 56, produced as vapor bubbles 55, are released from the vapor/liquid interface. The heat transmissions A-D referred to hereinabove would not occur as isolated phenomena but interact with one another as they occur, thereby accelerating the process of heat transfer.

Figure 5:
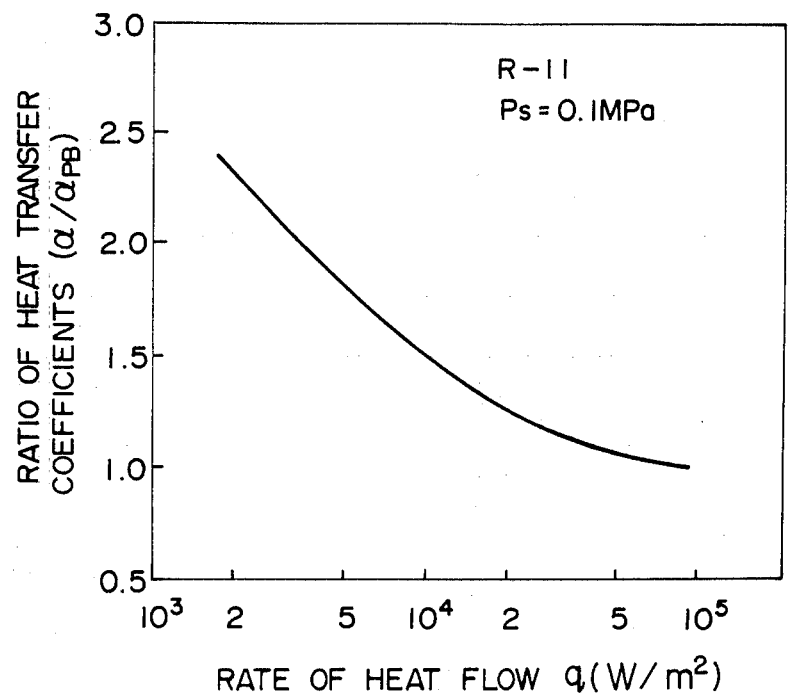
FIG. 5 is a diagram showing a relationship between the rate of heat flow and the increasing rate of heat transfer rate.

Meanwhile, organic refrigerants, such as Freon, are lower than water in latent heat of evaporation, specific heat and thermal conductivity. Therefore, it has been assumed that the use of an organic refrigerant could not achieve a high rate of heat transfer as has been achieved by using water as a working fluid, when vaporization of a liquid film is effected on a planar surface without any provision of surface structures as are described above. In this invention, it is further pointed out that the use of such porous surfaces in thin film evaporators brings greater heat transfer enhancement than that achieved in pool boiling where the heat transfer tubes are dipped in a pool of liquid. To demonstrate this, experiments have been conducted on the use of Freon R-11 as a working fluid for performing liquid film evaporation heat transfer. FIG. 5 is a diagram showing the results of the experiments in which the abscissa represents the rate of heat flow q (W/m$^2$), and the ordinate indicates the rate of enhancement of heat transfer, expressed in terms of the heat transfer coefficient in the case of thin film evaporation on the porous surface divided by that in the case of pool boiling on the same porous surface, $\alpha/\alpha_{PB}$. In this experiment, the best surfaces measured 0.3×0.1 m and the liquid at the supply trough was saturated Freon R-11 under atmospheric pressure which was allowed to flow downwardly from upper ends of the heat transfer surfaces in an amount of 0.264 kg/m.s per unit width.

Figure 6:
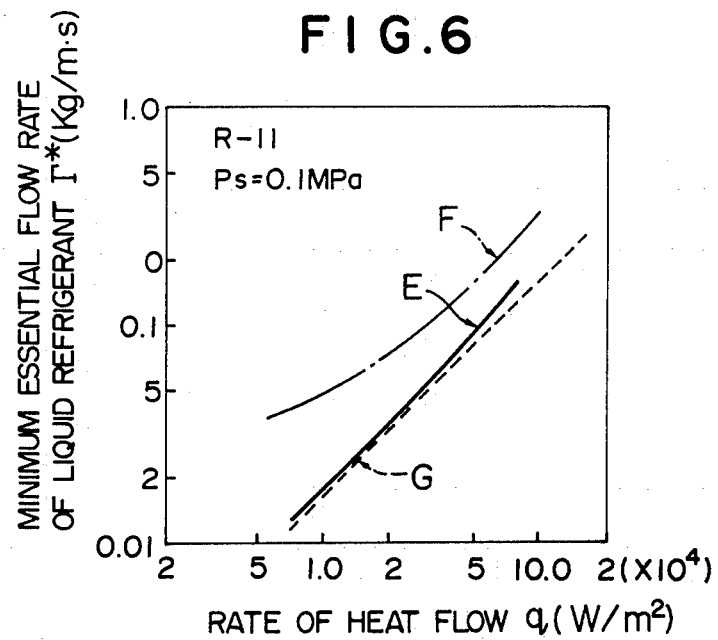
FIG. 6 is a graphical illustration of a relationship between the rate of heat flow and the minimum essential flow rate of liquid refrigerant.

FIG. 6 shows a diagram in which the abscissa represents the rate of heat flow q (W/m$^2$) and the ordinate indicates the necessary minimum flow rate $\Gamma^*$ (kg/m.s) per unit width of heat transfer surface at upper ends of the heat transfer surfaces, to show the minimum flow rate which is essential to maintain heat transfer performance at a high level. In the figure, a solid line E represents the flow rate of the liquid refrigerant on the heat transfer surfaces of the porous material layers 3 shown in FIG. 3, a dash-and-dot line F indicates the flow rate thereof on the heat transfer surfaces of the planar surfaces ground by means of an emery grinder #1000, and a broken line G shows an ideal flow rate thereof in which the liquid refrigerant would completely change into a gaseous state on the lower end of heat transfer surfaces.

When the planar smooth surfaces are used as heat transfer surfaces in performing liquid film evaporation heat transfer, it is a difficult art to spread the liquid refrigerant uniformly across the span of the heat transfer surface and dry portions tend to appear on the heat transfer surfaces. In such situation, in order to avoid the emergence of dried areas on the heat transfer surface, it is necessary to let the liquid refrigerant flow in large quantities on the heat transfer surfaces, as shown by the line F in FIG. 6. Thus, in order to facilitate the spreading of the liquid refrigerant film on the heat transfer surfaces and to ensure the nonexistence of dry portions on the heat transfer surfaces even when the liquid refrigerant is used in a minimum essential quantity or a quantity in which all the refrigerant vaporizes when exposed to heat transferred thereto, it would be necessary to use heat transfer surfaces which would have high heat transfer performance even when the flow rate is low. The porous material layers 3 serving as heat transfer surfaces have the function of drawing a liquid refrigerant in the openings 59 by interfacial tension and allowing a liquid film to be formed over the entire heat transfer surfaces.

Figure 7:
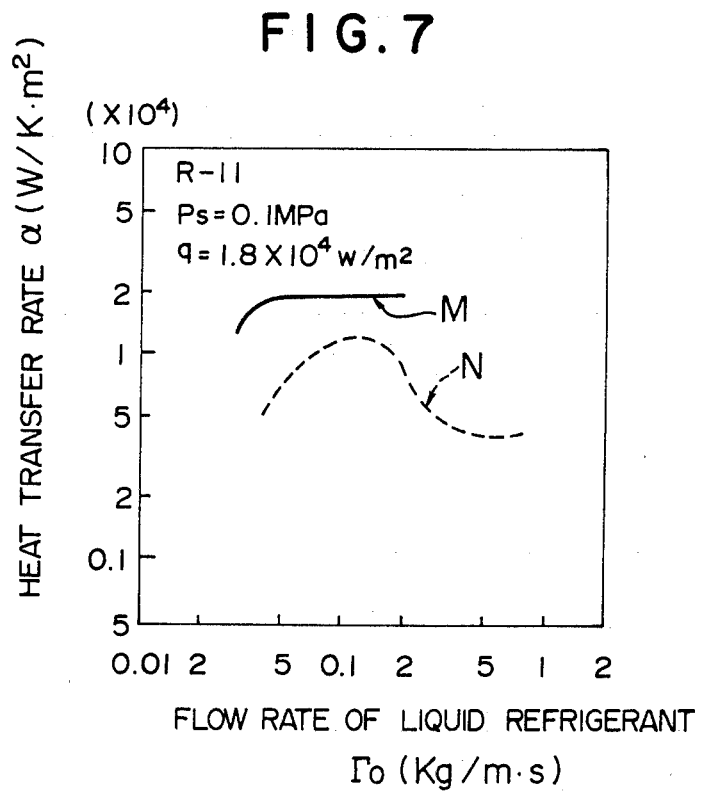
FIG. 7 is a graphical illustration of a relationship between the heat transfer rate and the flow rate of liquid refrigerant.
Figure 8:
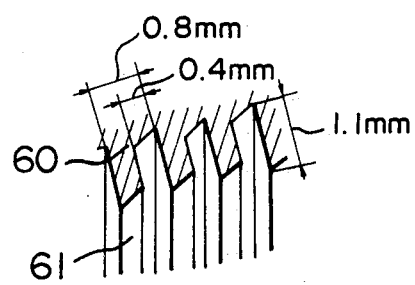
FIG. 8 is a fragmentary perspective view of the vertically grooved heat transfer surface.

In heat exchangers of the liquid film vaporization heat transfer type, it is necessary that their performance be stable. If the heat transfer performance of a heat exchanger undergoes great changes when the flow rate of the downwardly flowing liquid is varied, the heat exchanger would not only be difficult to design but also be unable to provide necessary heat exchanging performance outside the designed operation range. The porous material layers 3 are excellent heat transfer surfaces in being stable in performance. FIG. 7 shows the relation between the liquid refrigerant flow rate $\Gamma_0$ (kg/m.s) and the heat transfer rate $\alpha$ (W/km$^2$) when the rate of heat flow q is $1.8 \times 10^4$ (W/m$^2$). In FIG. 7, a solid line M and a broken line N represent heat transfer characteristics of a porous material heat transfer surface 57 shown in FIG. 3 and a heat transfer surface 60 with vertical grooves having small fins 61 of a height of 1.1 mm, a thickness of 0.4 mm and a pitch of 0.8 mm as shown in FIG. 8, respectively. The dimensions of the heat transfer surfaces and the conditions under which measurements were made are similar to those of the experiments shown in FIGS. 5 and 6.

It will be apparent that the heat exchangers of the liquid film evaporation heat transfer type are able to maintain their performance at a high level even when an organic refrigerant, such as Freon, is used as a working fluid, and that when porous material layers are used as heat transfer surfaces, the performance can be kept at a high level with a low flow rate of the refrigerant and in a stable condition.

From the foregoing description, it will be appreciated that the invention enables an overall compact size to be obtained in a heat exchanger of the liquid film evaporation heat transfer type by increasing the heat transfer area per unit volume while allowing resistance offered to the flow of vapor produced to be greatly reduced. In the invention, the provision of porous material layers, serving as evaporation and heat transfer surfaces, enables the heat transfer rate to be kept at a high level and allows a reduction in heat exchanging performance which might otherwise be caused by a variation in the flow rate of liquid to be avoided.

Also, the provision of a plurality of warm water passageways in each heat transfer duct to improve the heat transfer rate of the heat transfer surfaces for the warm water makes it possible to improve heat exchanging performance by producing a large volume of vapor even if the volume of the heat exchange is small and the temperature difference between the warm water and liquid medium is also small. Additionally, the provision of a bubble pump for obtaining circulation of the liquid medium by utilizing vapor bubbles produced by nucleate boiling allows heat exchanging performance to be kept at a high level by supplying a stable flow of liquid film irrespective of variations in the load applied to the heat exchanger.

What is claimed is:

1. A liquid film evaporation type heat exchanger in which a medium in a liquid state flows downwardly in the form of a film along heat transfer surfaces, the heat exchanger comprising:

at least two heat transfer units arranged within a housing at locations spaced apart from each other in a direction in which the medium in the liquid state flows, each of said heat transfer units including a plurality of flat heat transfer ducts each formed with a plurality of warm water passageways extending substantially perpendicular to the direction of flow of the medium in the liquid state, and a plurality of liquid distributing beams which block a medium in a gaseous state, each of said beams is formed with a plurality of cutouts through which said medium in the liquid state flows downwardly, said flat heat transfer ducts and said liquid distributing beams being alternately arranged in the respective units;

guide plate means disposed inside said housing and surrounding lateral sides of said heat transfer units to define a vapor passageway between said guide plate means and said housing;

a liquid medium sump located above an uppermost heat transfer unit for supplying the medium in the liquid state into said heat transfer units;

a chamber provided in said housing below said heat transfer units and filled with the medium in the liquid state;

another heat transfer unit disposed in said chamber and including a plurality of flat heat transfer ducts each formed with a plurality of warm water passageways extending substantially in the same direction as the warm water passageways formed in the heat transfer ducts of said at least two heat transfer units; and port means positioned between the at least two heat transfer units and communicating a space inside said guide plate means with said vapor passageway for releasing the medium in the gaseous state within said space into said vapor passageway.

2. A liquid film evaporation type heat exchanger as claimed in claim 1, further comprising passage means for communicting said liquid medium sump with said chamber for leading the medium in the liquid state from said chamber to said liquid medium sump through a bubble pump action.

3. A liquid film evaporation type heat exchanger as claimed in claim 1, wherein each of said flat heat transfer ducts of said at least two heat transfer units is provided on surfaces thereof with a porous material layer.

* * * * *